United States Patent
Huang

(10) Patent No.: US 7,236,218 B2
(45) Date of Patent: Jun. 26, 2007

(54) LOCATING DEVICE FOR MEASURING DISTANCES BETWEEN DOTS OF A LIGHT GUIDE PLATE AND METHOD FOR USING SAME

(75) Inventor: Chuan De Huang, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 302 days.

(21) Appl. No.: 10/726,043

(22) Filed: Dec. 1, 2003

(65) Prior Publication Data

US 2004/0109171 A1    Jun. 10, 2004

(30) Foreign Application Priority Data

Nov. 29, 2002    (TW) ................... 91134729 A

(51) Int. Cl.
G02F 1/1335 (2006.01)
F21V 9/14 (2006.01)
(52) U.S. Cl. ............... 349/65; 362/26; 362/31
(58) Field of Classification Search ........ 356/614; 385/120, 147; 349/64–65, 113; 362/31, 362/330, 339, 561, 558; 359/42, 48, 619–620
See application file for complete search history.

(56) References Cited

U.S. PATENT DOCUMENTS

| | | | | |
|---|---|---|---|---|
| 5,394,308 A * | 2/1995 | Watanabe et al. | ........... | 362/613 |
| 5,442,482 A * | 8/1995 | Johnson et al. | ............. | 359/619 |
| 5,886,759 A * | 3/1999 | Mashino et al. | ............. | 349/65 |
| 5,898,166 A * | 4/1999 | Fukuda et al. | ............. | 235/494 |
| 6,310,698 B1 * | 10/2001 | Samworth | ................... | 358/3.12 |
| 6,412,968 B1 * | 7/2002 | Ohkawa | ....................... | 362/26 |
| 6,425,673 B1 * | 7/2002 | Suga et al. | ................. | 362/613 |
| 6,447,136 B1 | 9/2002 | Liu et al. | | |
| 6,456,279 B1 * | 9/2002 | Kubo et al. | ................. | 345/173 |
| 6,559,911 B2 * | 5/2003 | Arakawa et al. | ............. | 349/96 |
| 6,642,975 B2 * | 11/2003 | Chino et al. | .................. | 349/65 |
| 6,677,294 B2 * | 1/2004 | Shaw et al. | ................. | 510/438 |
| 6,827,458 B2 * | 12/2004 | Suga | .......................... | 362/609 |
| 6,865,325 B2 * | 3/2005 | Ide et al. | .................... | 385/120 |

* cited by examiner

Primary Examiner—Sang H. Nguyen
(74) Attorney, Agent, or Firm—Wei Te Chung

(57) ABSTRACT

A locating device for measuring distances between dots of a light guide plate includes a sheet having a plurality of reference points marked thereon. The plurality of reference points is configured for locating of the dots during measuring, and a distribution density of the reference points is lower than a distribution of the dots. A preferred method for using a locating device to measure distances between dots of a light guide plate includes the steps of: providing the locating device having a plurality of reference points marked thereon, the plurality of reference points being configured for locating of the dots, a distribution density of the reference points being lower than a distribution density of the dots; attaching the locating device to a surface of the light guide plate that is opposite to the dots; and gauging distances between the dots using a microscope.

15 Claims, 2 Drawing Sheets

LOCATING DEVICE FOR MEASURING DISTANCES BETWEEN DOTS OF A LIGHT GUIDE PLATE AND METHOD FOR USING SAME

BACKGROUND OF THE INVENTION

1. Field of the Invention

The present invention relates to devices for measuring distances between dots of light guide plates (LGPs) of liquid crystal displays (LCDs), and methods for using such devices.

2. Description of the Prior Art

A typical liquid crystal display device comprises an LCD panel, and a backlight system mounted under the LCD panel for supplying light beams thereto. The backlight system mainly comprises a light source and an LGP. The LGP is normally a transparent polymer plate, and is used for guiding light beams emitted by the light source to uniformly illuminate the LCD panel.

A typical LGP has a main light emitting surface, and an opposite bottom surface. The bottom surface has a plurality of dots formed thereon, for diffusing light from the light source.

Conventionally, dimensional parameters such as distances between the dots and a pattern distribution of the dots need to be gauged and verified before the LGP is used, in order to confirm that characteristics of the dots are of satisfactory quality.

Customarily, the dimensional parameters of the dots of the LGP are gauged by a measuring instrument such as a microscope. However, when using such an instrument, there are no reference points for obtaining measurements. Therefore, the dots generally have to be first counted and located in a field of vision before measurements can be obtained. This makes the gauging procedure unduly slow, and there is also the risk of error due to miscounting of the dots.

SUMMARY OF THE INVENTION

Accordingly, an object of the present invention is to provide a locating device for conveniently measuring distances between dots of an LGP.

Another object of the present invention is to provide a method for conveniently using a locating device to measure distances between dots of an LGP.

In order to achieve the first object set out above, a locating device configured for measuring distances between dots of a light guide plate in accordance with the present invention comprises a sheet having a plurality of reference points marked thereon being configured for locating of the dots during measuring. A distribution density of the reference points is lower than a distribution of the dots.

In order to achieve the second object set out above, a preferred method of the present invention for using a locating device for measuring distances between dots of a light guide plate comprises the steps of: providing the locating device having a plurality of reference points marked thereon, the plurality of reference points being configured for locating of the dots, a distribution density of the reference points being lower than a distribution density of the dots; attaching the locating device to a surface of the light guide plate that is opposite to the dots; and gauging distances between the dots using a measuring instrument.

These and other features, aspects and advantages of the present invention will become more apparent from the following detailed description and claims, and from the accompanying drawings in which:

DETAILED DESCRIPTION OF THE PRESENT INVENTION

Reference will now be made to the drawings to describe the present invention in detail.

Figure 1:
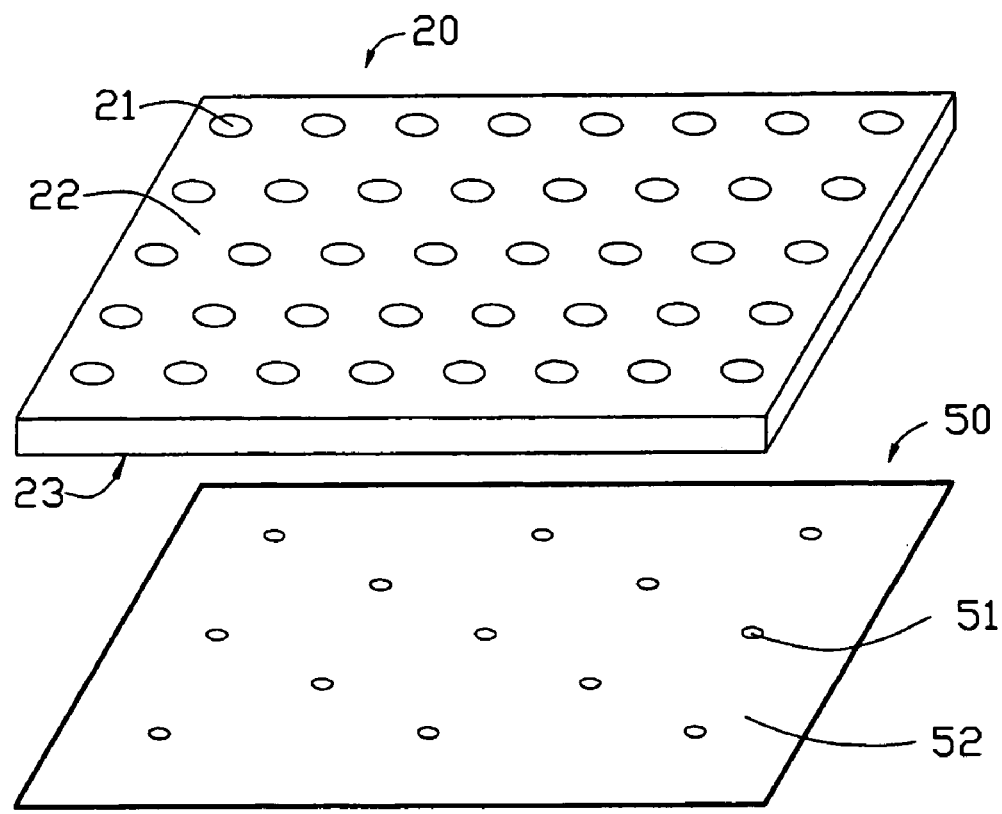
FIG. 1 is an isometric view of a locating device in accordance with a first embodiment of the present invention, together with an LGP ready to be measured.

Referring to FIG. 1, a locating device 50 in accordance with a first embodiment of the present invention is positioned adjacent to an LGP 20 that has a plurality of dots 21 to be measured. The LGP 20 includes a main light emitting surface 23 and an opposite bottom surface 22. The dots 21 are on the bottom surface 22.

The locating device 50 includes a sheet 52 and a plurality of reference points 51 marked thereon in a regular array. The reference points 51 may, for example, be colored dots. An area of the sheet 52 is substantially equal to an area of the light emitting surface 23. A distribution density of the reference points 51 on the sheet 52 is lower than a distribution density of the dots 21 on the bottom surface 22. A material of the sheet 52 is plastic or polyester, such as polyethylene terephthalate.

Figure 2:
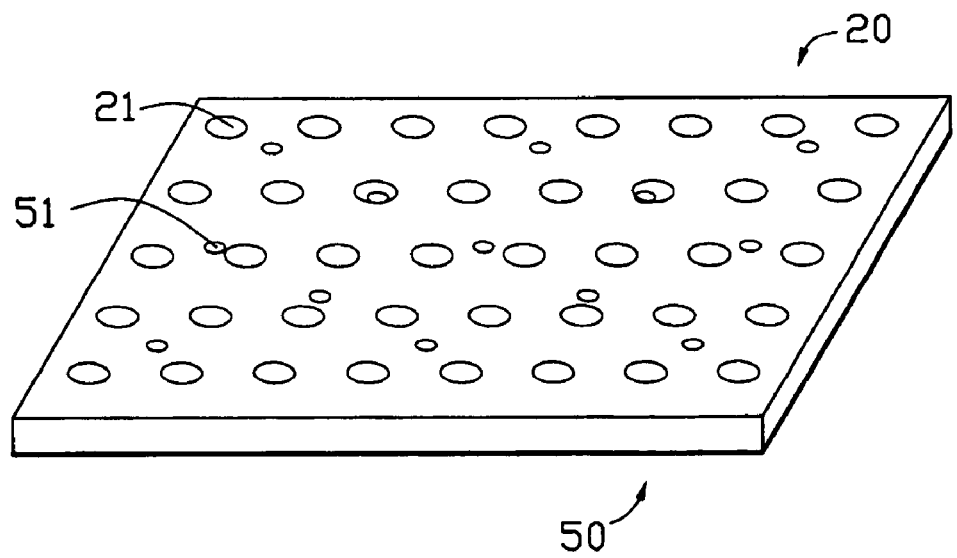
FIG. 2 is an isometric view of the locating device and LGP of FIG. 1 attached together.

Referring also to FIG. 2, in use, the locating device 50 is directly attached on the light emitting surface 23 of the LGP 20 to be measured. Due to the transparency of the LGP 20, the reference points 51 are still visible when the bottom surface 22 is observed. As a result, each reference point 51 acts as a fixed point for measurement of dots 21 adjacent to it.

Figure 3:
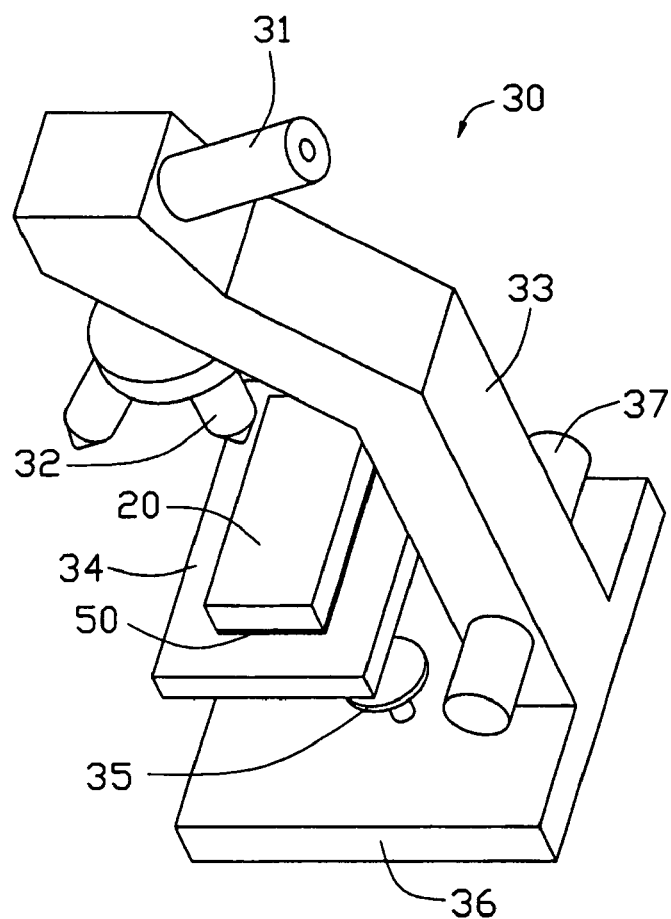
FIG. 3 is an isometric view of a microscope used in accordance with the preferred method of the present invention, showing the combined locating device and LGP of FIG. 2 stationed therein.

FIG. 3 is an isometric view of a measuring instrument 30 used in accordance with the preferred method of the present invention. Preferably, the measuring instrument 30 is a microscope 30. The microscope 30 includes an eyepiece 31, an object lens 32, an arm 33, an object carrier 34, a reflector 35, a base 36, and a location screw 37. The combined locating device 50 and LGP 20 are stationed in the microscope 30.

Referring to FIGS. 1, 2 and 3, the preferred method for using the locating device 50 includes the steps of:
(1) providing the locating device 50 having a plurality of reference points 51 marked thereon for locating of the dots 21;
(2) attaching the locating device 50 to the light emitting surface 23 opposite to the dots 21; and
(3) gauging distances between the dots 21 using the microscope 30.

In step (3), first, the LGP 20 with the locating device 50 attached thereto is placed on the object carrier 34 of the microscope 30. Second, the location screw 37 is adjusted in order to properly focus the object lens 32. Third, distances between the dots 21 are gauged by using the reference points 51, which provide fixed points for dots 21 adjacent thereto.

Figure 4:
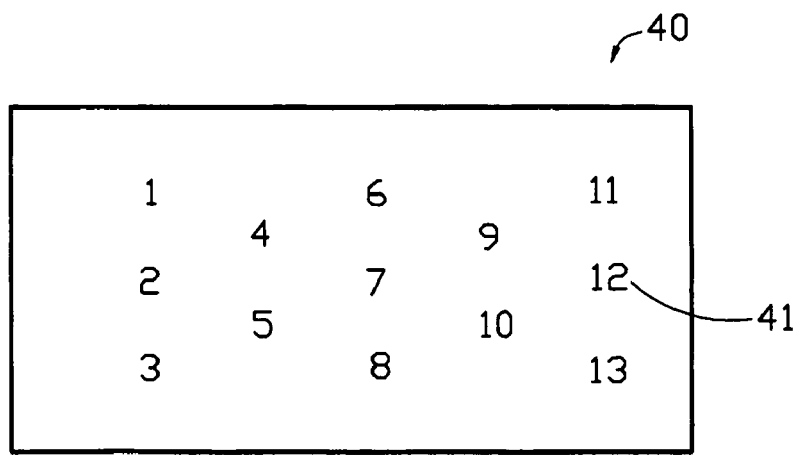
FIG. 4 is a top elevation of a locating device in accordance with a second embodiment of the present invention.

FIG. 4 is a top elevation of a locating device 40 in accordance with a second embodiment of the present invention. The locating device 40 is similar to the locating device 50 of the first embodiment, except that the locating device 40 has reference points 41 that are marked with numbers.

While the present invention has been described with reference to particular embodiments, the description is illustrative of the invention and is not to be construed as limiting the invention. Therefore, various modifications of the described embodiments can be made by those skilled in the art without departing from the true spirit and scope of the invention as defined by the appended claims. In particular, the references points 51, 41 may be marked with appropriate markings or symbols other than dots or numbers.

What is claimed is:

1. A locating device configured for attachment to a surface of a light guide plate that is opposite to another surface thereof, the another surface having dots thereon, the locating device further being configured for measuring distances between the dots, the locating device comprising a sheet having a plurality of reference points marked thereon, the plurality of reference points being configured for locating of the dots during measuring, wherein a distribution density of the reference points is lower than a distribution density of the dots.

2. The locating device as recited in claim 1, wherein the reference points are marked in a regular array.

3. The locating device as recited in claim 1, wherein the sheet comprises plastic.

4. The locating device as recited in claim 1, wherein the sheet comprises polyester.

5. The locating device as recited in claim 4, wherein the sheet comprises polyethylene terephthalate.

6. The locating device as recited in claim 1, wherein the reference points are colored dots.

7. The locating device as recited in claim 1, wherein the reference points are marked with numbers.

8. A method for using a locating device for measuring distance between dots of a light guide plate, comprising the steps of:
providing the locating device having a plurality of reference points marked thereon, the plurality of reference points being configured for locating of the dots, a distribution density of the reference points being lower than a distribution density of the dots;
attaching the locating device to a surface of the light guide plate that is opposite to the dots; and
gauging distance between the dots using a measuring instrument.

9. The method as recited in claim 8, wherein the locating device comprises a sheet having the reference points marked in a regular array.

10. The method as recited in claim 9, wherein the sheet comprises plastic.

11. The method as recited in claim 9, wherein the sheet comprises polyester.

12. The method as recited in claim 11, wherein the sheet comprises polyethylene terephthalate.

13. The method as recited in claim 8, wherein the reference points are colored dots.

14. The method as recited in claim 8, wherein the reference points are marked with numbers.

15. The method as recited in claim 8, wherein the measuring instrument is a microscope.

* * * * *